United States Patent Office 2,844,508
Patented July 22, 1958

2,844,508
SUBSTITUTED MERCURIC 8-HYDROXY QUINOLINATES

Robert O. Weiss, West Milford, and Seymour J. Lederer, East Paterson, N. J., assignors to Metalsalts Corporation, Hawthorne, N. J., a corporation of Nevada No Drawing. Application June 10, 1955
Serial No. 514,748

9 Claims. (Cl. 167—33)

The present invention is directed to new compounds which are organic mercury derivatives and more particularly to compounds having highly desirable properties as disinfectants, such as disinfectants for seeds and plants.

There have been on the market for a number of years, seed disinfecting materials which are mercury derivatives and which generally have the formula R—Hg—X, wherein R is an organic radical and X is generally an inorganic acid radical. While such compounds have effectiveness in disinfecting seeds, they generally give only a limited protection at the surface of the seed. Many of the compounds of this type previously used have undesirable properties in that they are toxic to human beings and are corrosive to the skin.

The present invention is directed to the production of a serious of organic mercury compounds which are highly effective for disinfection generally and particularly for the disinfecting of seeds, plants and soil.

It is among the objects of the present invention to provide compounds of the above described character which are substantially less toxic and which are less vesicant in the ordinary and usual handling thereof, as compared to prior compounds.

It is also among the objects of the present invention to provide compounds of the type described, which have a substantial amount of water solubility and a sufficient amount of volatility at ordinary temperatures so that they may be used effectively either in aqueous solution or in dust compositions.

The compounds contemplated herein have the following general formula:

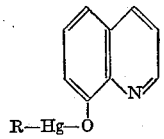

R—Hg—O wherein R is methyl or ethyl, said compounds having a substantial degree of volatility at approximately room temperatures combined with a substantial degree of solubility in water.

We have found that the above-defined compounds have a very desirable and useful balance between the degree of water solubility and the degree of volatility, so that they are highly effective for the disinfection of seeds, plants and soil while being at the same time less hazardous for the user to handle as compared with known alkyl mercurials. The volatility is also such that the effectiveness in use lasts a considerable period of time. Also, because of the definite though moderate degree of volatility, the volatilized portion creates a zone of protection around the seed and within the soil, including the area which is not in direct physical contact with the disinfecting agent. Thus a far greater degree of protection and a much better chance of surviving in a healthy state is given to the seed because of the fungus-free zone surrounding it.

It is surprising that compounds of the present type are so highly efficient, in view of the ineffectiveness of the individual compounds from which the new compounds are prepared. Thus, 8-hydroxy-quinoline, which is an active fungicide and a highly volatile compound, has been found to be ineffective as a cereal seed-treatment fungicide because of limited anti-microbial spectrum. The chelated metal salts such as copper, bismuth, iron and zinc are so non-volatile that analytical procedures can be applied to them which require drying at elevated temperatures with no loss of product. Even mercury, which is itself a highly volatile metal, and forms many volatile salts, yields non-volatile mercuric 8-hydroxy quinolinate. Diphenyl mercury and many phenyl mercuric salts are volatile. Yet, phenylmercuric 8-hydroxyquinolinate is relatively non-volatile.

In accordance with the present invention, the new compounds are prepared by reacting methyl and ethyl mercuric salts, such as the halides (preferably the bromides and chlorides) and acetates, or their hydroxides, with a soluble salt, preferably an alkali metal salt, of 8-hydroxyquoinoline. It was to be expected from the properties of the chelated metal salts of 8-hydroxyquinoline and of phenylmercuric 8-hydroxy-quinoline that our new compounds would also be non-volatile. Nevertheless, the new lower alkyl mercuric 8-hydroxy-quinolinates have been found to possess the surprising and unexpected property of having an adequate, although desirably limited volatility. The volatility is of such an order that, for example, the methyl and ethyl mercuric 8-hydroxyquinolinates show excellent activity and reliability as cereal seed-treatment fungicides. They are however sufficiently less volatile than ethyl mercuric chloride and the other more commonly used cereal seed-treatment fungicides to make handling less hazardous and to permit storage for extended periods without the danger of toxic concentrations being built up in the atmosphere of the storage area.

The methyl and ethyl mercuric 8-hydroxyquinolines of the present invention have also a surprising degree of solubility in water in comparison with higher alkyl and aralkyl mercuric 8-hydroxy quinolinates. This valuable property makes it possible to use them in solution as well as in dusts; and whereas the alkyl mercuric salts most commonly used as cereal seed-treatment fungicide, such as ethyl mercuric chloride, ethyl mercuric phosphate, and methyl mercuric chloride are all highly powerful vesicants, the methyl and ethyl mercuric 8-hydroxyquinolinates have markedly decreased vesicant action, making handling much safer and simpler.

The invention is further illustrated by the examples given below, it being understood that said examples are presented only as illustrative of the invention and not in limitation thereof.

*Example 1.—Methyl mercuric 8-hydroxyquinolinate*

31 gms. of methyl mercuric iodide were added to a solution of 16.8 gms. of sodium 8-hydroxyquinolinate in 300 cc. of water. The mixture was agitated for 2 hours and filtered to yield 21.3 gms. of a golden yellow precipitate, melting point 135–137° C.

*Example 2.—Ethyl mercuric 8-hydroxyquinolinate*

To 16.8 gms. of sodium 8-hydroxyquinolinate in 300 cc. of water were added 30 gms. of ethyl mercuric hydroxide. The mixture was stirred for 2 hours. Filtration gave 22.4 gms. of golden yellow crystals, melting point 66–66.5° C.

The volatility and solubility of the compounds of the present invention were determined. The volatility was measured in percent of weight loss after standing for seven days at temperatures of 22–24° C. The results are as follows:

| Compound | Percent Weight-Loss | Percent Water-Solubility |
|---|---|---|
| Methyl Mercuric 8-hydroxyquinolinate | 8.00 | 0.75 |
| Ethyl Mercuric 8-hydroxyquinolinate | 0.30 | 0.85 |
| n-Lauryl Mercuric 8-hydroxyquinolinate | 0.04 | 0.06 |
| n-Octadecyl Mercuric 8-hydroxyquinolinate | 0.03 | 0.12 |
| Phenethyl Mercuric 8-hydroxyquinolinate | 0.07 | 0.12 |

The weight loss is sufficient so that the compounds are highly satisfactory for seed disinfecting purposes. Also the solubility is sufficient so that solutions thereof contain an adequate amount of the compound to be effective, but the solubility is not so great that the dried residues of the solutions are readily dissolved by rain or the like. This is in contrast to certain of the prior art compounds of 8-hydroxyquinoline, as shown in the following table:

| Compound | Percent Weight-Loss | Percent Water-Solubility |
|---|---|---|
| Bismuth 8-hydroxyquinolinate | 0.00 | $<1 \times 10^{-6}$ |
| Zinc 8-hydroxyquinolinate | 0.00 | $<1 \times 10^{-5}$ |
| Mercury 8-hydroxyquinolinate | 0.00 | $<1 \times 10^{-6}$ |

The loss of weight of the prior art compounds is zero, indicating that they are not at all volatile at ordinary atmospheric temperatures. Also the solubility in water while being measurable, is so small as to be negligible, in view of which the compounds cannot be used in solution.

While in the examples one of the starting materials is 8-hydroxyquinoline, the invention is also applicable to hydroxyquinolines wherein the hydroxy group is in any of the free positions.

We claim:
1. Compounds having the following general formula:

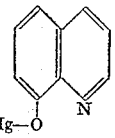

R—Hg—O wherein R is a radical taken from the class consisting of methyl and ethyl, said compounds having both a substantial degree of volatility at room temperatures and a substantial degree of solubility in water.

2. Methyl mercuric 8-hydroxyquinolinate.
3. Ethyl mercuric 8-hydroxyquinolinate.
4. Process of disinfecting seeds and plants which comprises applying to them an aqueous solution of a compound as defined in claim 1.
5. Process of disinfecting seeds and plants which comprises applying to them a dust containing a compound as defined in claim 1.
6. Process for the manufacture of preparations suitable for the disinfection of seeds, plants, and soil, which comprises intimately mixing a member of the group consisting of methyl and ethyl mercuric halides, acetates and hydroxides, with a soluble metal salt of 8-hydroxyquinoline.
7. Process according to claim 6, wherein methyl mercuric halide is reacted with sodium 8-hydroxyquinolinate.
8. Process for the manufacture of preparations suitable for the disinfection of seeds, plants and soil, which comprises mixing a methyl mercuric halide in water with sodium 8-hydroxyquinolinate.
9. Process for the manufacture of preparations suitable for the disinfection of seeds, plants, and soil, which comprises mixing ethyl mercuric hydroxide in water with sodium 8-hydroxyquinolinate.

References Cited in the file of this patent
UNITED STATES PATENTS
2,085,065     Anderson     June 29, 1937

OTHER REFERENCES

Lettre et al.: Die Naturwissenschaften, vol. 4, page 127 (1947).